July 19, 1927.
P. P. GARBARINO
HYDRANT
Filed Jan. 16, 1926
1,636,599
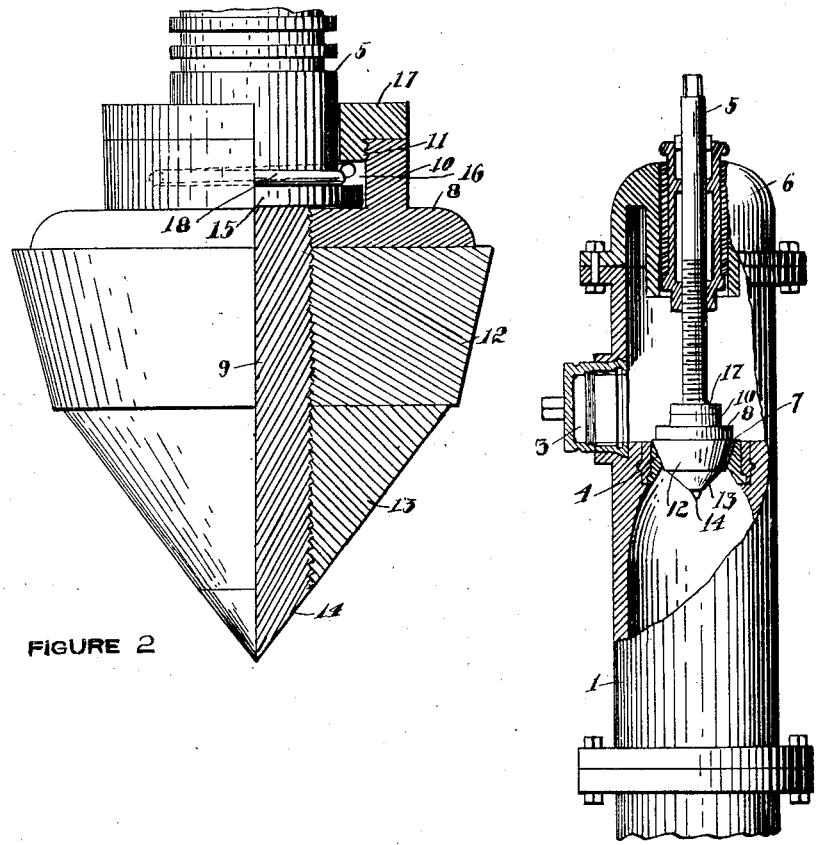
FIGURE 2
FIGURE 1
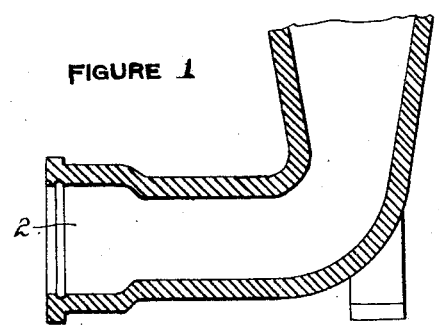
INVENTOR
Paul P. Garbarino
BY John A. Naismith
ATTORNEY Patented July 19, 1927.

1,636,599

UNITED STATES PATENT OFFICE.

PAUL P. GARBARINO, OF SAN JOSE, CALIFORNIA.

HYDRANT.

Application filed January 16, 1926. Serial No. 81,712.

As now constructed the valve head in the valve mechanism of a hydrant, is moved axially relative to the valve seat by means of a flanged valve stem held in a pocket in the upper side of the valve head by lock nut encompassing the stem and screwed into the valve head. This construction permits a certain amount of play at all times between the valve head and the stem, and when water is being discharged through the valve under high pressure this play permits a chattering of the valve head which creates a highly objectionable noise as well as strong vibrations in the water and pipes through which is flows. This vibration of the water, or "knocking" as it might be called, sometimes becomes so powerful as to rupture the pipes through which the water passes. Furthermore the form of the valve head is such that the side presented to the water flowing through the valve helps to generate these destructive vibrations by presenting a flat surface to the water passing through and consequently readily creating a vibratory motion whenever the water pressures suddenly varies.

It is one object of the invention to provide a valve structure wherein the chattering and vibration above referred to is entirely corrected and prevented.

It is another object of the invention to provide a valve structure of the character indicated that will be simple in construction, economical to manufacture, and highly efficient in its practical application.

In the drawing:—

Figure 1 is a side elevation of a hydrant embodying my invention partly in section and partly broken away.

Figure 2 is an enlarged side elevation of a portion of a valve embodying my invention, partly in section.

Referring more particularly to the drawing, I show at 1 the body portion of a hydrant with the intake at 2 and the outlet at 3, the valve seat being indicated at 4.

The valve stem 5 is mounted in the head 6 of the hydrant in the usual manner and carries a valve head 7.

The valve head 7 comprises a carrier element 8 carrying an externally threaded pin 9 in axial alignment with its axis of revolution, and having an upstanding annular flange 10 formed thereon on the side opposite to the said threaded pin, this flange being internally threaded as indicated at 11.

On the pin 9 is mounted the rubber valve part 12 the periphery of which is conical in form for engagement with seat 4, and this part 12 is held in position by a conical nut 13 threaded on to the threaded end of pin 9, the said pin 9 terminating in a conical end portion as at 14.

The lower end of valve stem 5 is provided with a laterally extending annular flange 15 adapted to seat in the pocket 16 formed on the upper side of part 8 by the flange 10. At 17 is a closure for this pocket 16, encircling valve stem 5 and screwing into the flange 10 as shown.

Encircling the valve stem 5 in pocket 16 and inserted between the flange 15 on stem 5 and the closure 17 is a spring element 18. These parts are so formed, proportioned and constructed that when assembled and the closure 17 screwed tightly into position the spring 18 is contracted and its resistance is greater than the water pressure to which the head may be subjected and therefore provides a constant pressure to hold the end of the valve stem tightly against the carrier element 8.

When the structure is constructed and assembled as described, the stem 5 is always freely revoluble relative to valve head 7, yet there is no play between the two that will permit development of vibrations or chattering with the injurious results hereinbefore referred to.

By bevelling the face of the parts forming the side of the valve head presented to the flowing water this danger of chattering is still further reduced and the work of the spring reduced.

The spring being incorporated in the structure when the same is assembled as above described, it naturally results that when wear occurs through operation of the valve, the resulting looseness is automatically taken up by the spring. By automatically preventing free relative play between these parts as the valve parts wear away the objectionable and more or less destructive vibrations are effectually prevented.

It is to be understood, of course, that while I have herein shown and described but one specific embodiment of my invention, changes in form, construction and method of operation may be made within the scope of the appended claims.

I claim:—

1. A valve comprising a carrier element provided with an externally threaded pin mounted thereon in axial alignment therewith and having an upstanding annular flange formed thereon on the side opposite to said pin, a resilient ring mounted on said pin, a nut mounted on said pin to engage said ring, a stem having a laterally extending flange formed on one end and insertible within the upstanding flange on said carrier element, a closure for the space surrounded by said upstanding flange and mounted upon said flange and encompassing said stem, and a resilient element inserted between said flange on said stem and said closure, the outer peripheries of the resilient ring and the nut being conical in form, and the pin carrying said nut and ring having a conical shaped end.

2. A valve comprising a valve head having a pocket formed in its upper end in concentric relation to its axis of rotation, a valve stem provided with an enlarged end adapted to seat in said pocket, a closure mounted on said head and encompassing said stem and closing said pocket, and a resilient element inserted between the enlarged end of said stem and said closure and having a resistance greater than the water pressure to which said head may be subjected.

PAUL P. GARBARINO.